July 11, 1972  C. B. BURCKHARDT ET AL  3,676,130
BEADED PLATE INTEGRAL PHOTOGRAPHY
Filed Nov. 26, 1969  2 Sheets-Sheet 1
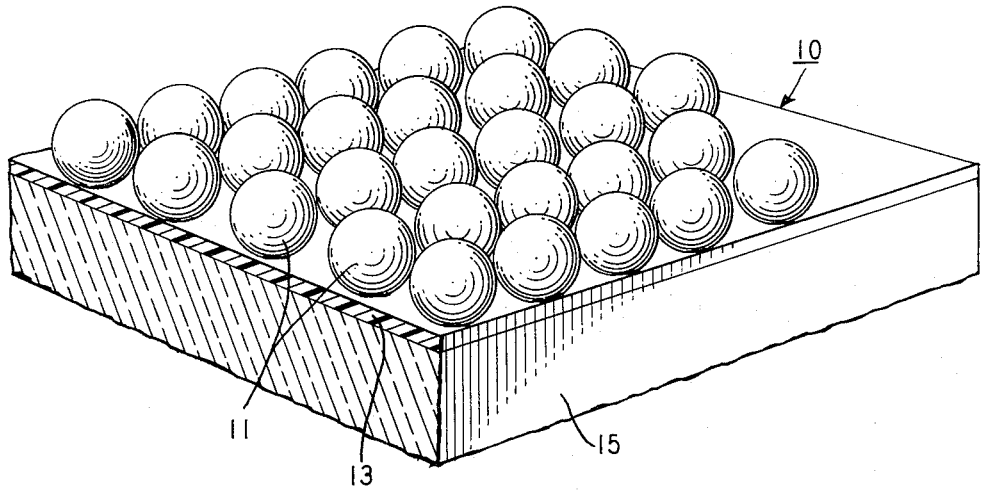
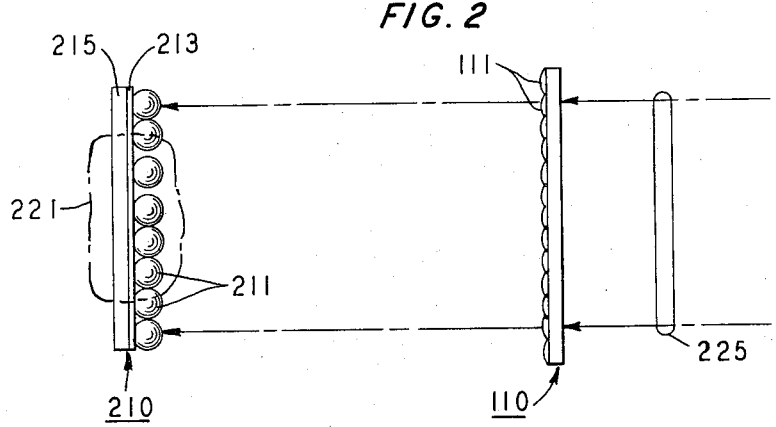
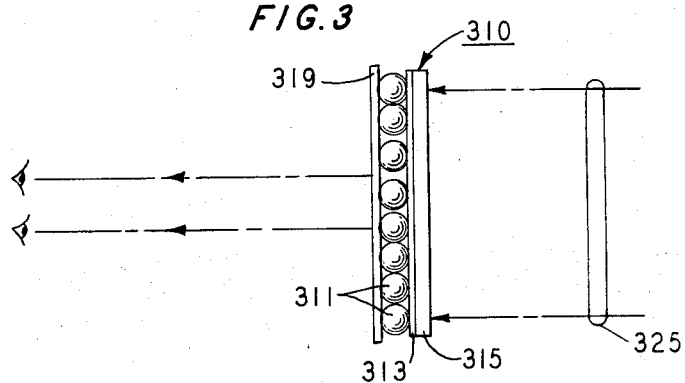
INVENTORS C. B. BURCKHARDT
E. T. DOHERTY
BY Francis E. Morris
ATTORNEY

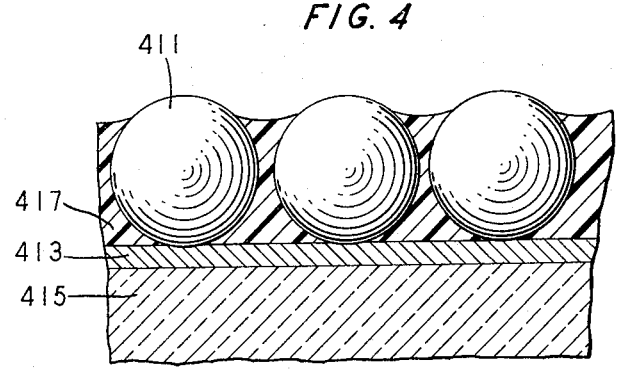
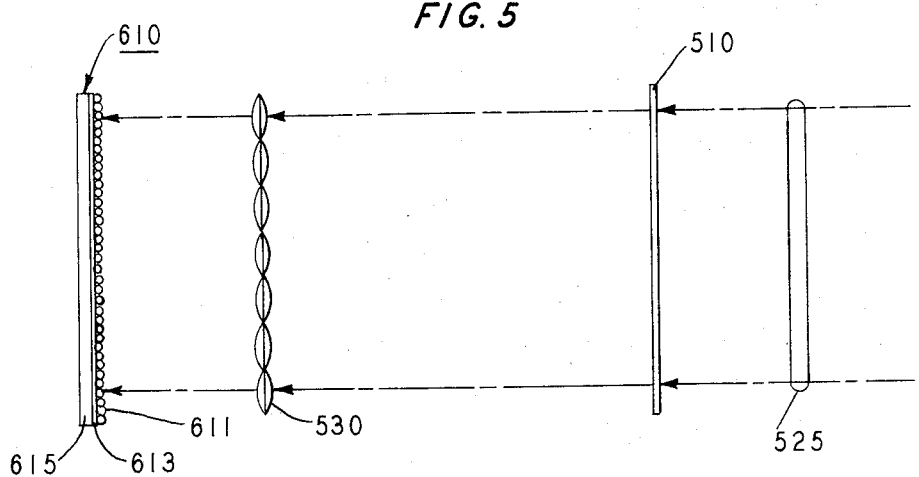

United States Patent Office 3,676,130
Patented July 11, 1972

---

3,676,130
BEADED PLATE INTEGRAL PHOTOGRAPHY
Christoph B. Burckhardt, Berkeley Heights, and Edward T. Doherty, Morris Township, Morris County, N.J., assignors to Bell Telephone Laboratories, Incorporated, Murray Hill and Berkeley Heights, N.J.
Filed Nov. 26, 1969, Ser. No. 880,280
Int. Cl. G03c 9/00
U.S. Cl. 96—40                           2 Claims

ABSTRACT OF THE DISCLOSURE

Apparatus for recording an integral photograph is disclosed comprised of a layer of minute, transparent spheres that adhere to a photosensitive emulsion.

BACKGROUND OF THE INVENTION

This concerns integral photography and in particular a combination of a fly's eye, or lenticular, lens and a photosensitive recording medium.

Integral photography is a method for recording and reconstructing images that appear to have three-dimensional properties. In this technique a fly's eye lens, which typically is comprised of a sheet of transparent material embossed with a multitude of small convex lenslets, is used to form on a recording medium a multitude of minute pictures of a scene. One such picture is formed behind each small lenslet; and each such picture represents a record of the scene observed from that particular lenslet. When this multitude of pictures, which is called an integral photograph, is illuminated from behind and viewed through the same fly's eye lens, an image is observed that has three-dimensional properties. Specifically, by changing the angle at which he views the integral photograph, a viewer is able to observe the scene from a different point of view.

While the image that is observed is three-dimensional, it is often unsatisfactory because it is pseudoscopic, that is, the depth and parallax properties of the image are the opposite of those of the original object so that what is seen in the front of the image is what is actually located at the rear of the object and vice-versa. This effect, however, can be eliminated by making an integral photograph of the pseudoscopic image formed from the first integral photograph. When this second integral photograph is illuminated from behind, a satisfactory three-dimensional image is observed because the pseudoscopic image of a pseudoscopic image of an object is an orthoscopic image that has the same depth and parallax properties as the original object. Further details on this and on other methods for converting pseudoscopic images into orthoscopic images may be found in the paper of C. B. Burckhardt, R. J. Collier and E. T. Doherty, "Formation and Inversion of Pseudoscopic Images," Applied Optics, vol. 7, p. 627 (April 1968), and in the references cited therein.

Not so easily resolved are some practical difficulties, encountered in forming the fly's eye lens and in using it to make and view an integral photograph. To form the fly's eye lens, it is standard practice first to form a die plate and then to use the die plate to stamp an array of convex surfaces into a transparent material. U.S. Pat. No. 2,834,231 discloses such a method in which an array of tiny steel balls are arranged on a plane surface of a device. A die plate is then squeezed against the upper surface of the array of steel balls to form an array of concave spherical indentations in the die plate. This plate is then squeezed against a suitable transparent material to emboss an array of lens elements on the material.

Ordinarily, because it is difficult to form a die that is as large as the desired dimension of the fly's eye lens, the step of embossing the transparent material with the die is repeated as many times as it necessary to produce a lens of the desired dimensions. Clearly, however, this step is complicated by the need to align the embossing operations with each other and by the requirement that the properties of all the lenses in the array be substantially the same. Consequently, a fly's eye lens is a relatively expensive optical device.

A second difficulty encountered in the use of the integral photograph is caused by the requirement that when the integral photograph is viewed each lenslet of the fly's eye lens must be aligned with the minute picture that is formed through that lenslet. As can be imagined, if the array of minute pictures is formed on a recording medium that is separate from the fly's eye lens and if the recording medium is removed from the image-forming apparatus for developing, the task of realignment can be quite tedious. To eliminate this need for realignment, it has been the practice to record the array of minute pictures in a layer of photographic emulsion coated to the back surface of the fly's eye lens. Obviously, any solution to the problem of forming the fly's eye lens would desirably be compatible with as simple a solution to the alignment problem.

SUMMARY OF THE INVENTION

Accordingly, it is an object of this invention to facilitate the formation of fly's eye lenses.

And it is a further object of this invention to facilitate the formation of fly's eye lenses while also eliminating the need for realigning the fly's eye lens with the recording medium when the integral photograph is viewed.

These and other objects of the invention are achieved by a combination of a fly's eye lens and a recording medium that illustratively comprises a layer of minute glass spheres that adhere to a photosensitive emulsion. To form the combination, glass spheres that typically have an index of refraction of approximately two and a diameter of less than 60 microns are simply distributed on the emulsion surface of a photographic plate in a process detailed below. Because the refractive index of the glass spheres is approximately two, paraxial light rays incident on each sphere are brought to focus near the interface between the glass sphere and the emulsion. Consequently, the image-forming properties of the glass spheres that adhere to the emulsion are similar to those of a conventional fly's eye lens and recording medium in which the recording medium is located near the focal plane of the lens. And as a result, this combination of glass spheres and photographic emulsion, which will be referred to below as a beaded plate, is readily used in place of a conventional fly's eye lens and recording medium to form an integral photograph.

As suggested above, the beaded plate is easily made in any dimensions and, because the right-sized glass spheres are readily available, quite inexpensive. Moreover, there are no alignment problems during the formation of the integral photograph or during its reconstruction.

BRIEF DESCRIPTION OF THE DRAWING

These and other elements, features and objects of our invention will be more clearly understood from the following detailed description of our invention taken in conjunction with the following drawing in which:

FIG. 1 illustrates an illustrative embodiment of our invention;

FIG. 2 illustrates the formation of a beaded plate integral photograph;

FIG. 3 illustrates the viewing of a beaded plate integral photograph;

FIG. 4 illustrates a second embodiment of our invention; and

FIG. 5 illustrates a third embodiment of our invention.

DETAILED DESCRIPTION OF THE DRAWING

A portion of an illustrative embodiment of the beaded plate we have invented is shown in FIG. 1. This plate, identified generally as element 10, is comprised of a layer of minute glass spheres 11 that adhere to a photographic emulsion 13 that is located on a surface of a transparent substrate 15. The glass spheres typically have an index of refraction of approximately two and a diameter that is less than approximately 60 microns. The photographic emulsion is a fine-grained, high resolution, high contrast silver halide emulsion approximately six microns thick. The glass plate is conventional and comparatively thick. Such an emulsion and glass plate are typified by a Kodak 649 GH plate.

To form the beaded plate, we first soak a plate such as a Kodak 649 GH plate for five minutes in room temperature water containing Kodak Photo-Flo 200 solution (primarily, ethylene glycol) at the manufacturer's recommended concentration of one part Photo-Flo to 200 parts water. After soaking, the plate is raised to a vertical position to let the excess water run off and is then laid out horizontally with the emulsion side up. While the emulsion is still moist, a multitude of the small glass spheres are sprinkled onto the emulsion. Next, the plate is removed from the safelight illumination under which the preceding steps were executed and dried for one hour in a horizontal position in the dark. After drying, the plate is immersed in water containing Photo-Flo and shaken gently to remove any glass spheres that do not adhere to the emulsion. After another drying, the beaded plate, comprised of a single layer of glass spheres adhering to the photographic emulsion, is ready for use.

Because the beaded plate has similar image-forming properties to those of a conventional fly's eye lens and recording medium, it may be used for any purpose that a fly's eye lens and recording medium can be used. For example, it can be used to record an integral photograph of a three-dimensional object if it is simply substituted for the conventional fly's eye lens and recording medium in the apparatus that forms the integral photograph. Such a modification is shown in the apparatus of FIG. 2 for forming an integral photograph having correct depth and parallax.

This apparatus is comprised of a first integral photograph 110 of an object (not shown) and a beaded plate 210 that replaces a conventional fly's eye lens and recording medium. Integral photograph 110 is comprised of a fly's eye lens 111 that faces plate 210 and an array of photographs of a three-dimensional object formed in the usual way by exposing a recording medium behind a fly's eye lens to light from the object. A pseudoscopic image 221 is reconstructed from photograph 110 by illuminating it from behind with a light beam 225; and an integral photograph of the pseudoscopic image is made by exposing a second recording medium behind a second fly's eye lens to the image-forming light from first integral 110. In FIG. 2, beaded plate 210, comprised of an array of glass spheres 211 that adhere to a layer of photographic emulsion 213 on a transparent plate 215, is used as the second fly's eye lens and recording medium in place of conventional apparatus. (For clarity, the scale of the glass spheres 211 and emulsion 213 is greatly enlarged with respect to the other elements of FIG. 2.) Light from integral photograph 110 that is incident on the front surface of the spheres is imaged near the interface between the glass spheres and the emulsion. Advantageously, the beaded plate is located as shown in the center plane of the real image 221 that is reconstructed from first integral photograph 110.

After the beaded plate is exposed, it is developed in reversal. Because the Kodak 649 GH plates we use are high resolution plates with a very high contrast while integral photographs advantageously have only ordinary contrast, we have devised the following reversal development procedure using a low contrast developer for the Kodak 649 beaded plates. First, we develop exposed beaded plates in undiluted Kodak D-76 for seven minutes. The plates are then washed for 55 seconds and then bleached for 110 seconds in FR bleach bath. Next the plates are washed for 55 seconds, cleared in FR clearing bath for another 55 seconds, and washed once more for 55 seconds. After this, the plates are illuminated long enough to expose all the remaining silver halide, typically for 30 seconds under a daylight fluorescent bulb. Next the plates are developed for two minutes in Kodak D-165 that has been diluted 3-to-1 and then washed for 55 seconds. The plates are then fixed in FR fixer for 55 seconds, washed for five minutes and then dried in air.

The Kodak D-76 is formed by adding to 750 cc. of water at 52° C., two grams of Kodak Elon, 100 grams of desiccated sodium sulfite, five grams of hydroquinone, two grams of borax, and enough additional water to make one liter of solution. The formula for Kodak D-165 is 1000 cc. of water, six grams of Kodak Elon, 25 grams of anhydrous sodium sulfite, 37 grams of sodium carbonate, and one gram of potassium bromide. Kodak Elon is p-methylaminophenol sulfate, $(CH_3NHC_6H_4OH)_2H_2SO_4$.

The FR-baths are proprietary solutions. If they are not readily available, the following baths are recommended. For the FR bleach bath, one may substitute a solution of 9.5 grams of potassium dichromate and 12 cc. of concentrated sulfuric acid in one liter of water. For the FR clearing bath, one may substitute a solution of 15 grams of sodium bisulfide in one liter of water. A substitute for the FR fixing bath may be prepared by adding to 600 cc. of water at 52° C., 360 grams of sodium thiosulfate (hypo), 50 grams of ammonium chloride, 15 grams of sodium sulfite, 47 cc. of 28% acetic acid, 7.5 grams of boric acid crystals, 15 grams of potassium alum, and enough water to make one liter of solution.

The light source for the exposure made during the reversal development has fairly high intensity and appreciable short wavelength radiation. The developing is done at 20° C. with nitrogen bubbling of the developer. Special care should be taken to use fresh developer and to ensure good agitation. Care should also be taken to avoid touching the side of each plate on which the glass beads are located lest some of the glass spheres be detached from the emulsion. However, as long as this care is taken and the above development process followed, the glass spheres remain attached to the surface of the emulsion throughout the development process and are firmly affixed to each developed plate once it is dry. For further protection of the glass spheres, a transparent sheet of glass or plastic can simply be placed over them.

After development, the image that is recorded on the beaded plate is viewed simply by illuminating the plate from behind. A typical viewing arrangement is shown in FIG. 3 and is comprised of simply the beaded plate, shown as element 310, a protective plate 319 covering the beaded plate, and a light beam 325 incident on plate 310 from behind. Again, plate 310 is comprised of an array of glass spheres 311 that adhere to a photographic emulsion 313 on a plate 315; and the scale of glass spheres 311 and emulsion 313 is enlarged with respect to the size of the other elements of FIG. 3. When beaded plate 310 is illuminated from behind, a viewer situate in front of beaded plate 310 as shown in FIG. 3 sees a pseudoscopic image of what was recorded on plate 310. Because the integral photograph recorded on plate 310 was a photograph of a pseudoscopic image of an object and because the pseudoscopic image of a pseudoscopic image is an orthoscopic image, the viewer will see a reconstructed image that has the same depth and parallax properties as the original object.

This use of the beaded plate integral photograph is especially suited for mass production of inexpensive beaded plate integral photographs because the first integral photograph can be an expensive fly's eye lens and photographic record that serves as a master while the copies are formed on inexpensive beaded plates.

Thus in practicing our invention, we have used as the first integral photograph a conventional integral photograph 20 x 25 centimeters in size of a figure 17.5 centimeters high, 12.5 centimeters wide and 10 centimeters deep. This photograph had been formed by a conventional fly's eye lens having individual lenslets of Lucite with a diameter of 2.8 millimeters and a focal length of 4.7 millimeters. The beaded plate, which had dimensions similar to the height and width of the figure, was exposed as described in the discussion of FIG. 2 and developed with the chemicals and processes detailed above. The resultant three-dimensional image exhibited good depth when it was viewed and could be observed over an angle of approximately 40°.

Obviously, numerous modifications can be made in our invention without departing from the spirit and scope of this disclosure. Different emulsions and substrates can be used and the developing chemicals and procedure can be modified to compensate for the different characteristics of different emulsions. The glass spheres that are used as lenslets on the beaded plates need not be perfectly spherical and, indeed, need not be made of glass. It is only necessary that the lenslets be transparent and have such a shape and index of refraction that they image incident electromagnetic radiation near the interface between the lenslets and the photographic emulsion. Consequently, variations in size, shape, and index of refraction from sphere to sphere can be tolerated. For our purposes, we have used glass spheres having a refractive index of approximately 1.92 and a diameter of 53–62 microns (mesh 230–270) purchased from Flex-O-Lite Manufacturing Corporation, St. Louis, Mo. Obviously, if the medium surrounding the glass spheres does not have a refractive index of approximately one, the index of the spheres should be adjusted so that paraxial light rays incident on the spheres are brought to focus near the interface between the glass spheres and the emulsion.

The optimum diameter of the spheres for a given wavelength $\lambda$ of incident radiation can be shown by the analysis set forth in the above-mentioned paper of Burckhardt et al. to be $1.24(\lambda b)^{\frac{1}{2}}$ where the beaded plate is located in the middle of the image that is recorded, as in FIG. 2, and $b$ is one-half the depth of the image. Consequently, for an image such as the one we recorded with a depth of ten centimeters, the optimum diameter of the spheres appears to be about 200 microns for a wavelength of 0.5 micron. Experimentally, however, while the use of spheres much smaller than 50 microns in diameter is limited by diffraction effects, the mere use of spheres much larger than 50 microns does not improve the quality of the reconstructed image primarily because aberrations cancel any improvements in image quality that might result from reduction in diffraction effects.

To some extent, it may be possible to reduce these aberrations and use larger spheres to improve image quality by aperturing the spheres with an opaque layer in the interstices between the spheres. Such a beaded plate is shown in cross-section as element 410 of FIG. 4. It comprises a layer of glass spheres 411 that adhere to a photographic emulsion 413 on a substrate 415, as in FIG. 1, but between the spheres is an opaque material 417 that acts as an aperture. Beaded plate 410 is formed the same way plate 10 of FIG. 1 is formed; but after the single layer of spheres is established on the emulsion, the opaque material is distributed between the spheres. For example, in making this embodiment of our invention, we have spread a suspension of India ink in gelatin on a beaded plate formed as detailed above. Excess quantities of the suspension were then removed with an air hose; and after the gelatin had hardened, the beaded plate was ready for use. Obviously, the opaque material that is used must permit the diffusion through it of the solutions used during the development process; and the use of the opaque material will affect the duration of the various steps of the development process. The selection of appropriate materials and the determination of the correct development times, however, will be straightforward to one of ordinary skill in the art.

As an alternative to using large spheres and an aperturing material, it is possible to improve the quality of the reconstructed image by reducing the size of the image that is recorded on the beaded plate because such a reduction decreases the magnitude of $b$, the half-depth of the image, and this in turn reduces the optimum size of the spheres. Clearly, such a reduction could be accomplished with a single lens; but if this is done, the viewing angle for the integral photograph that is formed on the beaded plate becomes quite small. Consequently, it is preferable to use an array of image-reducing lenses.

The use of such an array of lenses is depicted in FIG. 5. The apparatus there shown comprises a first integral photograph 510 of an object (not shown), a beaded plate 610 and an array of image-reducing lenses 530. Integral photograph 510 and beaded plate 610 are similar to photograph 110 and plate 210 of FIG. 2; and, as in FIG. 2, beaded plate 610 comprises a layer of glass spheres 611 that stick to a photographic emulsion 613 on a substrate 615. Typically, each image-reducing lens in the array has a focal length of about 100 millimeters and a radius of curvature of about 50 millimeters while the thickness of the emulsion and the diameter of the spheres of plate 610 is on the order of microns and tens of microns, respectively. For convenience in illustrating these very different sized elements, the image-reducing lenses have been drawn on a different scale from that of the glass spheres and emulsion of the beaded plate; and the fly's eye lens on the side of integral photograph 510 facing lenses 530 is not shown. As in the case of forming an ordinary beaded plate integral photograph in FIG. 2, a light beam 525 is directed at the first integral photograph 510 from behind and light from this photograph is formed into real images about beaded plate 610. The size of the images formed about beaded plate 610 is, however, reduced by the image-reducing lenses; and, as a result, the size of the glass spheres 611 on the beaded plate is more nearly optimum.

After the beaded plate integral photograph is developed, it can be viewed by directing light back through the beaded plate and the image-reducing lenses. As in FIG. 3, the illuminating beam is incident on the beaded plate from behind; and, as can be inferred from the requirements of integral photography, the relation of the image-reducing lenses to the beaded plate during viewing should be the same as the relation between these objects during formation of the beaded plate integral photograph.

While the use of the image-reducing lenses does complicate the procedure for forming the beaded plate photograph, the array of image-reducing lenses is fairly easy and inexpensive to make because the size of each lens in the array is considerably greater than the size of a lenslet in an ordinary fly's eye lens; and perfect lenses are not required. Moreover, the alignment between the beaded plate and the lenses that is required for viewing is not too stringent. Obviously, because of the equivalent characteristics of the beaded plate and a conventional fly's eye lens, a conventional fly's eye lens could also be used with an array of image-reducing lenses.

In addition to using spheres of different sizes, shapes, and indices of refraction in practicing our invention, it is also possible to use spheres of different colors. The use of such colored spheres enables one to record information about the color of an object; and if enough spheres of the proper colors are interspersed throughout the beaded plate, the image that is reconstructed from the beaded plate will be in color. Specifically, a beaded plate comprised of equal numbers of minute red, green, and blue spheres distributed randomly on an ordinary black and white emulsion will reconstruct a color image.

Numerous variations in our invention are also possible with respect to the arrangement of the elements, procedures that are used, and the like. For example, as indicated in the discussion related to FIG. 2, the beaded plate is best located in the image plane of the pseudoscopic image reconstructed from the first integral photograph; but it could be located elsewhere. Similarly, while an integral photograph such as photograph 110 of FIG. 2 is one means for recording information that is reconstructed as a pseudoscopic image, other means are available. For example, a hologram could be used instead because the real image reconstructed from a hologram is pseudoscopic. In other cases where a reconstructed pseudoscopic images is acceptable, a beaded plate integral photograph can be formed simply by exposing a beaded plate directly to light from the object. And where reversal development is not required, the development process can be modified accordingly.

Still other modifications and applications within the scope of our invention will be obvious to those of ordinary skill in the art.

What is claimed is:

1. A method for recording an integral photograph comprising the steps of:
   soaking in a water solution a fine-grained high-resolution, high-constrast photographic emulsion that is approximately six microns thick and is mounted on a substrate;
   sprinkling onto the emulsion a multitude of minute transparent spheres having an index of refraction of approximately two and a diameter of less than approximately 200 microns;
   removing any transparent spheres that do not adhere to the emulsion;
   exposing said emulsion by directing electromagnetic radiation from the object through an array of lenses to form reduced-size real images of the object, and thence through the spheres to form in the emulsion adjacent each sphere an image of the object; and
   developing the emulsion with a low-contrast developer to form an integral photograph.

2. A method for recording an integral photograph comprising the steps of:
   soaking in a water solution a fine-grained high-resolution, high-contrast photographic emulsion that is approximately six microns thick and is mounted on a substrate;
   sprinkling onto the emulsion a multitude of minute transparent spheres having an index of refraction of approximately two and a diameter of less than approximately 200 microns;
   removing any transparent spheres that do not adhere to the emulsion;
   exposing said emulsion by directing electromagnetic radiation from an object through the spheres to form in the emulsion adjacent to each sphere an image of the object; and
   developing the emulsion with a low-constrast developer to form an integral photograph, the developing step comprising the steps of:
   developing the emulsion in undiluted Kodak D–76 for approximately seven minutes;
   washing the emulsion;
   bleaching the emulsion in bleach bath for approximately 110 seconds;
   washing the emulsion;
   clearing the emulsion in a clearing bath for approximately 55 seconds;
   washing the emulsion;
   exposing the emulsion to ordinary illumination;
   developing the emulsion in Kodak D–165 that has been diluted 3-to-1 for approximately two minutes;
   washing the emulsion;
   fixing the emulsion in fixer for approximately 55 seconds;
   washing the emulsion; and
   drying the emulsion.

References Cited

UNITED STATES PATENTS

| | | | |
|---|---|---|---|
| 471,187 | 3/1892 | McDonough | 96—80 |
| 3,530,779 | 9/1970 | Alofs | 96—81 X |
| 2,214,531 | 9/1940 | Killick | 96—117 X |
| 1,987,443 | 1/1935 | Ives | 96—40 X |
| 2,021,162 | 11/1935 | Walton | 96—40 X |
| 1,991,888 | 2/1935 | Ernst | 96—116 |
| 2,045,129 | 6/1936 | Farrand | 96—40 X |

OTHER REFERENCES

Focal Encyclopedia of Photography, vol. 2, Focal Press, New York, fully revised edition, 1965, pp. 1293–1298.

DAVID KLEIN, Primary Examiner

U.S. Cl. X.R.

96—80, 81